United States Patent
Platt

(10) Patent No.: US 7,055,031 B2
(45) Date of Patent: May 30, 2006

(54) METHOD FOR GENERATION, DELIVERY, AND VALIDATION OF ELECTRONIC COUPONS THROUGH PERSONAL TV SERVICE SYSTEM

(75) Inventor: David C. Platt, Mountain View, CA (US)

(73) Assignee: TiVo, Inc., Alviso, CA (US)

( * ) Notice: Subject to any disclaimer, the term of this patent is extended or adjusted under 35 U.S.C. 154(b) by 911 days.

(21) Appl. No.: 09/784,512

(22) Filed: Feb. 14, 2001

(65) Prior Publication Data

US 2002/0112159 A1 Aug. 15, 2002

(51) Int. Cl.
*H04L 9/00* (2006.01)

(52) U.S. Cl. .............. 713/168; 726/4; 726/6; 726/9; 726/10; 726/28; 726/30; 726/29; 713/161; 713/171; 713/176; 713/169; 713/170; 380/278; 380/282; 380/30; 705/14; 705/67; 705/71; 705/72; 705/75; 705/76; 705/78; 235/462

(58) Field of Classification Search ............. 705/14, 705/16, 67, 71–72, 75–76, 78; 380/30, 282, 380/278; 235/662, 462; 713/200–202, 161, 713/168, 169–171, 176
See application file for complete search history.

(56) References Cited

U.S. PATENT DOCUMENTS

| 5,602,918 | A | * | 2/1997 | Chen et al. | ............... 713/153 |
| 5,852,665 | A | * | 12/1998 | Gressel et al. | ............... 380/30 |
| 6,385,591 | B1 | * | 5/2002 | Mankoff | ............... 705/14 |
| 6,450,407 | B1 | * | 9/2002 | Freeman et al. | ............ 235/492 |
| 6,766,301 | B1 | * | 7/2004 | Daniel et al. | ............... 705/14 |
| 2001/0014868 | A1 | * | 8/2001 | Herz et al. | ................. 705/14 |

* cited by examiner

*Primary Examiner*—Ayaz Sheikh
*Assistant Examiner*—Longbit Chai
(74) *Attorney, Agent, or Firm*—Hickman Palermo Truong & Becker, LLP

(57) ABSTRACT

A process for coupon generation, delivery, and validation over a personal TV service system is disclosed. A client issues electronic coupons to personal TV service customers via a personal TV service center which generates a coupon authentication number for each receiver. The coupon authentication number is known to the key server and the coupon authentication number database. It is also known to the receiver in encrypted form. The product serial number for each receiver acts as a public key, which is known to both the customer and the personal TV service center. A unique offer ID number is assigned to each coupon. When the receiver receives the coupon, it performs a hash operation on the offer ID number using the authentication ID number and takes first or last N digits of the hashed result as the coupon ID number. The customer may redeem the coupon by submitting the offer ID number, the receiver serial number, and the coupon ID number. Before the coupon is redeemed, it must be validated. The personal TV service center takes the receiver serial number as a public key to look up the unencrypted coupon authentication number stored in the database and performs a same hash operation on the offer ID number using the authentication number. The key server takes the first or the last N digits of the hashed result and compare this number with the coupon ID number submitted by the customer. If these two numbers match, the coupon is validated.

28 Claims, 4 Drawing Sheets

METHOD FOR GENERATION, DELIVERY, AND VALIDATION OF ELECTRONIC COUPONS THROUGH PERSONAL TV SERVICE SYSTEM

BACKGROUND OF THE INVENTION

1. Technical Field

The invention relates to prosecution of electronic coupons using telecommunication technology. More particularly, the invention relates to a process and methods for generation, delivery, and validation of electronic coupons through a personal television service system.

2. Description of the Prior Art

Traditionally, a coupon is a certificate that one can use to buy a product or service at a reduced price or to get it free, or to get information, used by businesses as a way to make their name more widely known or to encourage sales. The coupons are usually printed objects, carrying printed indicia or a coupon number to prevent forgery. Printed coupons are issued and distributed via newspapers, magazines, flyers or other publications. To redeem a coupon, the coupon holder needs to surrender the coupon to the vendor and the vendor examines the coupon to verify by the printed indicia whether or not the coupon is valid. Upon successful verification, the vendor provides the goods or services to the customer, and then collects the coupon to remove it from circulation.

The printed coupons may be redeemed remotely through a central electronic coupon management facility wherein a database containing information for valid coupons communicates with a plurality of remote terminals, enabling telecommunications operators to verify or validate a coupon in real-time. Each coupon in the database has a unique coupon number that is cryptographically transformed when released to a customer. A plurality of operator consoles are linked to the coupon management facility and can request verification, validation and other processing of the coupons. In operation, a customer communicates with an operator located at one of the operator consoles, and reads the cryptographic coupon number on an issued coupon to the operator. The operator uses the operator console to communicate the coupon information to the coupon management facility. A message is returned to the operator indicating the status of the coupon. If the coupon is available, the operator provides the customer the goods or services authorized via the coupon.

A coupon may be generated in electronic form and issued via telecommunication means such as television or Internet. With the advent of personal television service (PTVS), through which a TV viewer may access to a centralized TV program guide database and program his digital video recorder anywhere, it has been realized that PTVS system would be a good channel to issue coupons to TV viewers.

Therefore, there is a need to develop a process for generating, delivering, and validating electronic coupons through a personal TV service system or similar telecommunication system with a higher security and convenience.

SUMMARY OF THE INVENTION

A process for coupon generation, delivery, and validation over a personal TV service (PTVS) system is disclosed. According to this invention, a client issues electronic coupons to one or more personal TV service customers through a personal TV service center. The coupon must be validated before a coupon is redeemed at any designated vendor or retail stores that accesses to the personal TV service center.

The present invention provides a cryptographic basis for coupon generation personal TV service receiver without changing its architecture. The personal TV service center generates one or more random coupon authentication numbers for each receiver. The coupon authentication numbers are known to the key server, the coupon validation number database, and the receiver in encrypted form as private keys. The receiver also has various public keys, one of which is its product serial number. This serial number is known to both the owner and the personal TV service center.

For each offer (coupon content), a unique offer ID number is designated either by the client or by the personal TV service center. The receiver performs a hash operation on the offer ID number using the coupon authentication number, and takes the first or last 6 digits of the hashed result as a coupon ID number. Thus each coupon comprises three numbers: an offer ID number representing a specific product or service, a receiver serial number representing the receiver owner (usually the coupon holder), and a coupon ID number representing this specific coupon. The customer may take these three numbers to a vendor and redeem the coupon or redeem the coupon remotely through an electronic coupon management system.

Before the coupon is redeemed, it must be validated. To validate the coupon, the personal TV service center uses the receiver serial number as the public key to look up the coupon authentication number stored in the database, and performs a hash operation on the offer ID number using the authentication number. The key server takes the first or the last 6 digits of the hashed result and compares this number with the coupon ID number submitted by the customer. If these two numbers match, the coupon is validated.

The present invention enables secure distribution and validation of coupons using the personal TV service system without need to change the current receivers' hardware infrastructure. The advantages and benefits of this invention are numerous. For example, it minimizes the amount of work involved to issue electronic coupons; the offer ID numbers and coupons ID numbers are flexible and short enough that a consumer can write them down easily on a piece of paper; these numbers are highly unpredictable and it is very difficult to crack them via brute-force methods.

DETAILED DESCRIPTION OF THE INVENTION

In the following detailed description of the invention, some specific details are set forth to provide a thorough understanding of the presently preferred embodiment of the invention. However, it will be apparent to those skilled in the art that the invention may be practiced in embodiments that do not use the specific details set forth herein. Well known methods, procedures, components, and circuitry have not been described in detail.

In the following discussion, in references to the drawings like numerals refer to like parts throughout the several views.

Figure 1:
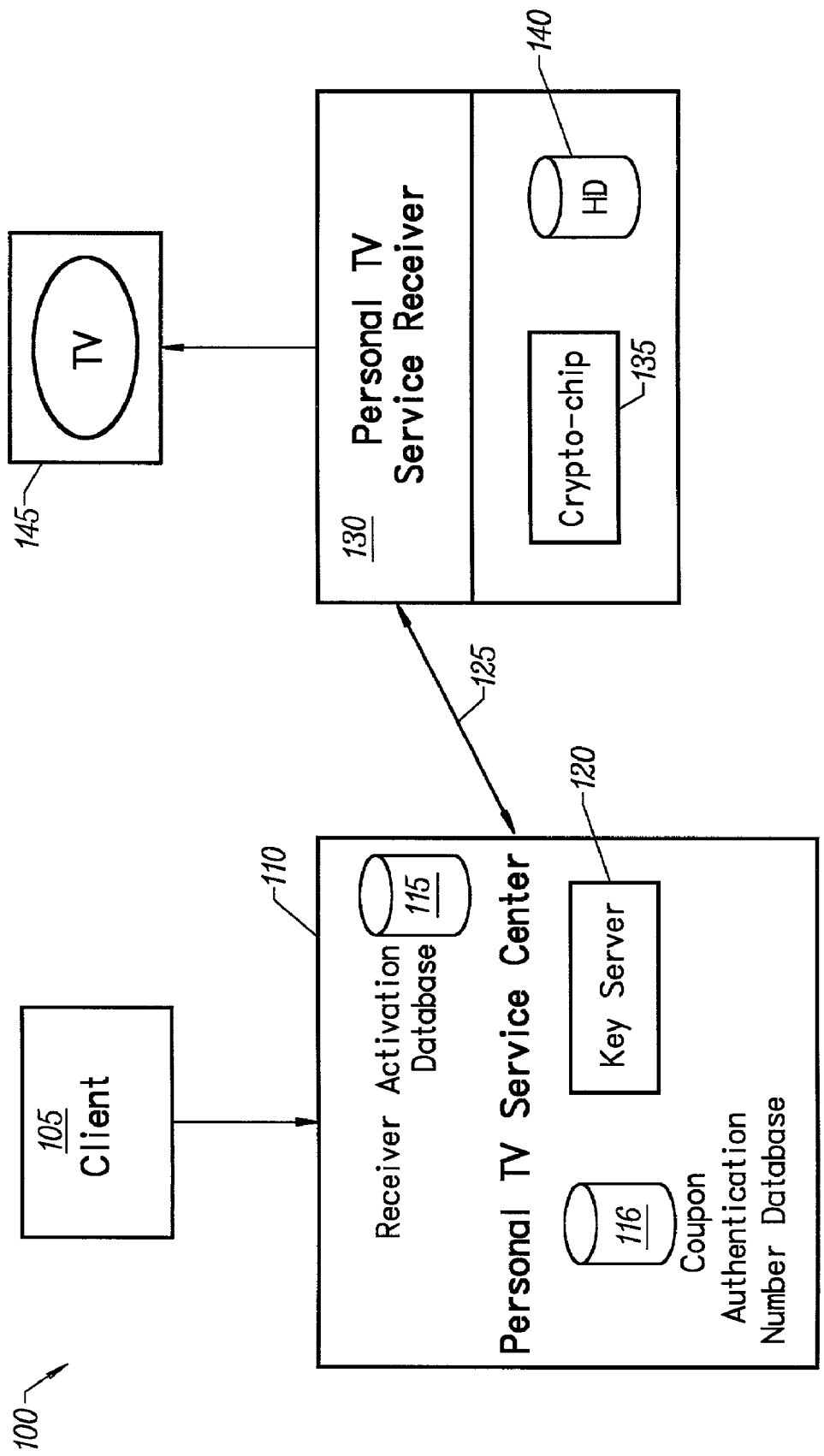
FIG. 1 is a block diagram illustrating a coupon distribution and encryption system.

FIG. 1 is a block diagram that illustrates a coupon distribution system 100. The preferred embodiment of this system comprises a client 105 which issues electronic coupons, a personal TV service (PTVS) center 110, a personal TV service (PTVS) receiver 130 which may be a personal video recorder, and a TV set 145 that displays TV programs and coupons. The PTVS center 110 comprises a receiver activation database 115, a coupon authentication number database 116 and a key server 120. The PTVS receiver 130 comprises a crypto-chip 135 and a hard drive 140.

The PTVS center 110 sends encrypted electronic coupons issued by the client 105 to the PTVS receiver 130 through a communication channel 125, which may be a telephone modem, a cable modem, or a local area network (LAN). Each PTVS receiver is assigned various public keys, one of which is the serial number of that receiver. The public keys are stored in the hard drive 140 of the PTVS receiver 130 and are also stored in the receiver activation database 115 in the PTVS center 110. One or two private keys are assigned to each PTVS receiver, which are stored in the crypto-chip 135 of the PTVS receiver 130.

The operation of the coupon distribution system 100 includes three processes:
process for coupon authentication number generation;
process for coupon delivery; and
process for coupon validation.

A. Process for Coupon Authentication Number Generation

Figure 2:
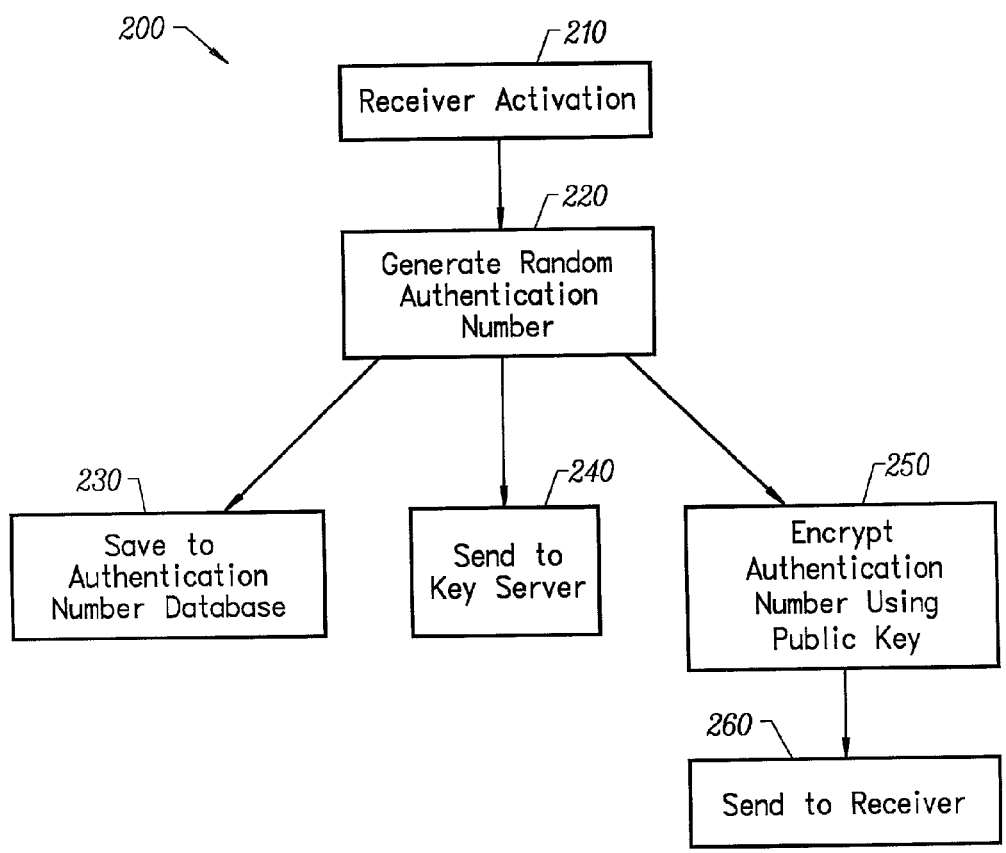
FIG. 2 is a data flow control diagram illustrating a process for coupon authentication number generation.

FIG. 2 is a data flow control diagram that illustrates a process 200 for coupon authentication number generation for each PTVS receiver. The process 200 comprises the steps of:

Step 210: The PTVS center 110 activates the PTVS receiver 130.

Step 220: Upon activation, the PTVS center 110 generates a coupon authentication number for the PTVS receiver. This coupon authentication number is randomly given and can be of any size up to 512 bits long or longer.

Step 230: The PTVS center 110 saves the coupon authentication number in the coupon authentication number database 116.

Step 240: The PTVS center 110 communicates the coupon authentication number to the PTVS key server 120.

Step 250: When the PTVS receiver 130 contacts the PTVS center 110 first time or next time, the PTVS key server 120 perceives that the PTVS receiver 130 has not yet had a coupon master key and then it encrypts the coupon authentication number using the PTVS receiver's El Gamal public key which is stored both in the receiver activation database 115 and in the PTVS receiver's hard drive 140.

Step 260: The key server 120 sends the encrypted coupon authentication number to the PTVS receiver 130 which adds the encrypted authentication number as an encrypted coupon key to its keyring. A date or time stamp may be embedded in the coupon key for convenience if the coupon validation number database 116 is ever compromised.

The process 200 for coupon authentication number generation takes 1–2 CPU seconds per PTVS receiver and needs to be done only once unless the coupon authentication number database 116 is compromised.

B. Process for Coupon Delivery

Figure 3:
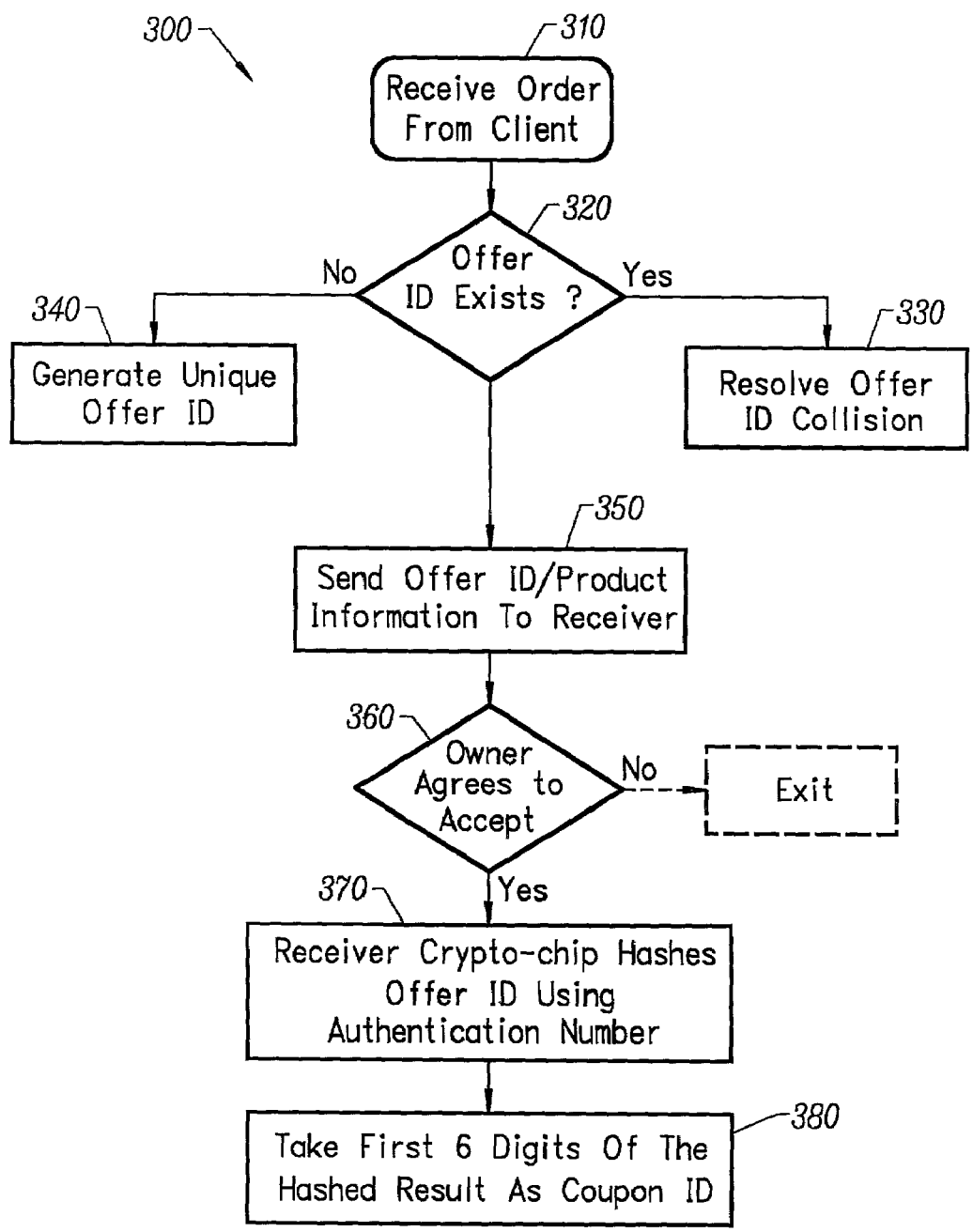
FIG. 3 is a data flow control diagram illustrating a process for coupon delivery.

FIG. 3 is a data flow control diagram that illustrates a process 300 for coupon delivery. The process 300 comprises the steps of:

Step 310: The PTVS center 110 receives an order from the client 105 to issue an electronic coupon, which is an offer to sell a specific product or service.

The client 105 may generate or acquire a unique offer ID number and communicate this offer ID number to the PTVS center 110. The offer ID number may be up to 512 bits in length. However, 32 bits is usually adequate and allows for a numeric encoding to identify the client and the offer. The offer ID number may also be implemented as ASCII character strings of up to 64 bytes.

Step 320: The PTVS center 110 checks whether or not the client 105 has generated an ID number for the offer.

Step 330: If the ID number exists, the PTVS center 110 checks the uniqueness of the ID number and resolves possible collisions with other offers.

Step 340: If the ID number does not exist, the PTVS center 110 creates a unique ID number for the offer. As described above, the offer ID number may be up to 512 bits in length and may also be implemented as ASCII character strings of up to 64 bytes.

Step 350: The PTVS center sends the offer ID number and coupon information to the TV set 145 through the PTVS receiver 130.

Step 360: Upon receipt of the coupon, the customer decides to accept or reject the offer.

Step 370: If the customer accepts the offer, the crypto-chip 135 in the PTVS receiver 130 performs a hash operation on the offer ID number using the coupon authentication number. Here, the PTVS receiver 130 uses its crypto-chip 135 to first decrypt the coupon authentication number yielding a number decryptedAuthenticator and then perform hash operation of SHA1 (offerID^decryptedAuthenticator). The hashed result is SHA1RESULT.

Step 380: The PTVS receiver takes the first 6 digits of the hashed result as a coupon ID number. Here, the PTVS receiver 130 treats SHA1RESULT as an integer, and calculates the coupon ID number as being (SHA1RESULT mod Intc), where Intc is a convenient integer of probably 10^6 or so, yielding a 6-digit coupon ID, which is the first 6 digits of SHA1RESULT.

This process takes 10–15 seconds. The PTVS receiver 130 may either put up a stopwatch icon, or display a screen giving detailed instruction about how the user can redeem the coupon.

C. Process for Coupon Validation

Figure 4:
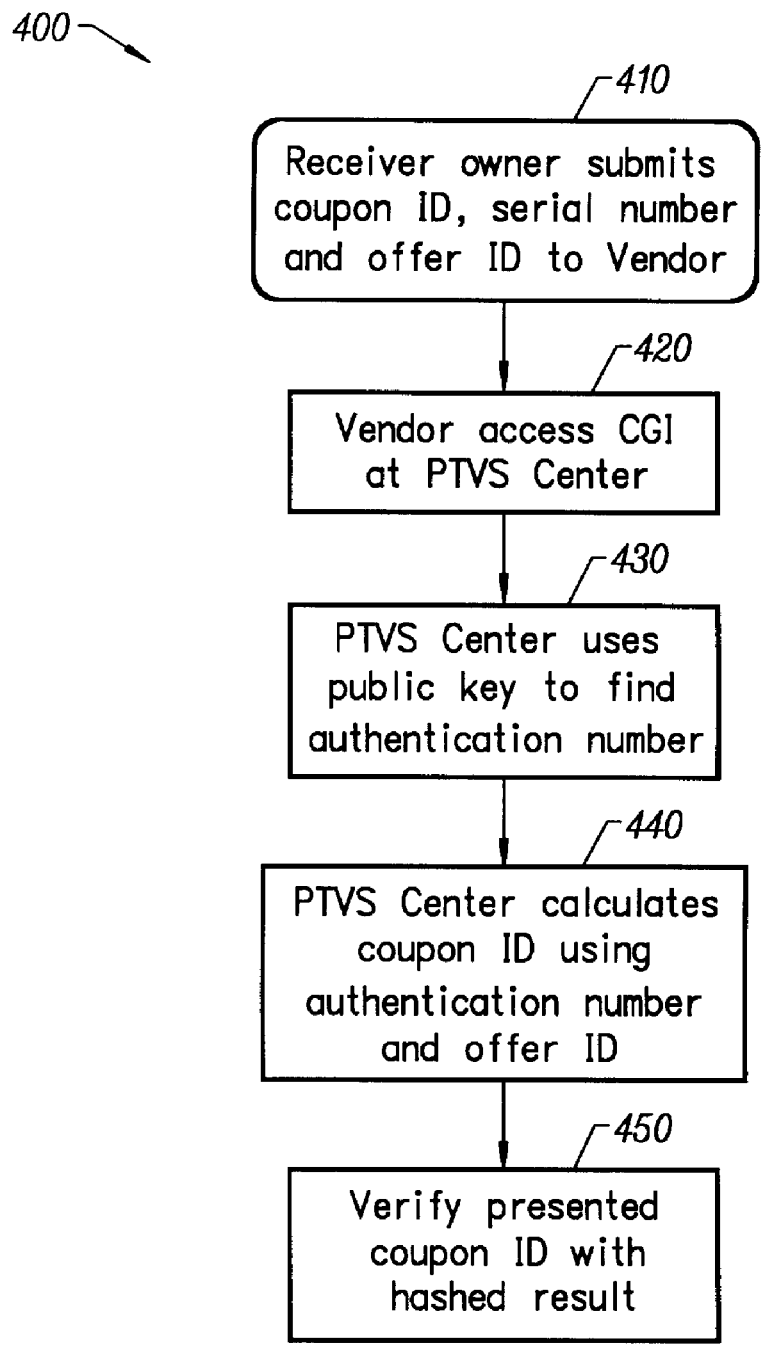
FIG. 4 is a data flow diagram illustrating a process for coupon verification.

FIG. 4 is a data flow diagram that illustrates a process 400 for coupon validation. The process 400 comprises the steps of:

Step 410: The customer submits the offer ID, the coupon ID, and the receiver serial number to a vendor.

Step 420: The vendor accesses to a Common Gateway Interface (CGI) at the PTVS center 110 and inputs the offer ID, the coupon ID, and the receiver serial number.

Step 430: The key server 120 looks up the unencrypted coupon authentication number from the coupon validation number database 116.

Step 440: The key server 120 uses the unencrypted authentication number as a key and performs a hash operation on the offer ID number as Step 370.

Step 450: The key server 120 takes the first 6 digits of the hashed result and compares this 6-digit number with the coupon ID number submitted by the customer. If these two numbers match, the coupon is validated.

Because SHA1 is highly unpredictable, it is very difficult to crack these numbers via brute-force methods. The reliability of these processes in terms of security depends on the coupon validation number database and the coupon ID size. If somebody breaks into the validation machine and siphons off the database, he could steal the validation numbers for all receivers and forge coupons at will. However, this can be prevented by keeping the validation machine behind a firewall and strictly limit the sorts of access permitted. In case there is a security leak, the service center will first fix the leak and then regenerate new coupon authentication numbers for all receivers and distribute them via the key server.

If the coupon ID is too small, for example, 3–4 digits, it becomes possible to generate coupon ID numbers by brute force. This can be prevented by generating coupon ID numbers with adequate length. In actuality, 5–6 digits would be good enough.

Although the invention is described herein with reference to the preferred embodiment, one skilled in the art will readily appreciate that other applications may be substituted for those set forth herein without departing from the spirit and scope of the present invention.

Accordingly, the invention should only be limited by the claims included below.

What is claimed is:

1. A process for generation, delivery, and validation of electronic coupons via a telecommunication system, comprising the sub-processes of:
   generating a unique coupon authentication number for each of a plurality of receiving devices;
   delivering an electronic offer ID to one or more receiving devices;
   wherein a receiving device generates a coupon ID number using the receiving device's coupon authentication number and the offer ID;
   validating said coupon ID number when a user redeems said coupon ID number using the receiving device's coupon authentication number;
   wherein said telecommunication system includes a service center, a plurality of receiving devices, a display device coupled to each receiving device, a communication channel connecting said service center and each receiving device;
   wherein said service center comprises at least an authentication number database and a key server;
   wherein said receiving device comprises a persistent storage device which stores one or more public keys assigned to said receiving device, and a crypto-chip which stores one or more private keys assigned to said receiving device;
   submitting said offer ID number, said receiving device's serial number, and said coupon ID number to a vendor by the user that redeems said coupon;
   entering said offer ID number, said receiving device's serial number, and said coupon ID number by said vendor who accesses said service center;
   checking, by said key server, said receiving device's authentication number from said authentication number database;
   performing a hash function on said offer ID number using said receiving device's authentication number as a key;
   taking the first N digits of the hashed result and comparing the N-digit number with said coupon ID number submitted by the user; and
   validating said coupon if said N-digit number matches with said coupon ID number.

2. The process according to claim 1, wherein the sub-process of generating a coupon authentication number for each receiving device comprises the steps of:
   activating a receiving device;
   wherein said coupon authentication number is randomly generated and can be of any length of bits;
   saving said coupon authentication number in said authentication number database;
   communicating said coupon authentication number to said key server;
   encrypting said coupon authentication number; and
   sending said encrypted coupon authentication number to a receiving device which adds said encrypted authentication number to said receiving device's keyring as a coupon key.

3. The process according to claim 2, wherein said step of encrypting said coupon authentication number is performed by said key server using said receiving device's public key which is stored both in an activation database and said receiving device's persistent storage device.

4. The process according to claim 2, further comprising the step of:
   embedding a date or time stamp in said coupon key for convenience to replace said authentication number when ever said authentication number database is compromised.

5. The process according to claim 1, wherein the sub-process of delivering an electronic offer ID to one or more receiving devices, comprising the steps of:
   receiving an order from a client to issue an electronic coupon, which is an offer to sell a specific product or service;
   confirming an offer ID number for said coupon;
   sending coupon information to said display device through said receiving device;
   performing a hash operation by said receiving device's crypto-chip on said offer ID number using said encrypted coupon authentication number if a user decides to accept said offer; and
   displaying the first N digits of the hashed result as a coupon ID number, with which, together with said offer ID number and said receiving device's serial number, the user may redeem said coupon.

6. The process according to claim 5, wherein said step of confirming an offer ID number for said coupon comprises the sub-steps of:
   checking whether or not said client has designated a unique offer ID number for said coupon;
   wherein if said client has designated a unique offer ID number for said coupon, checking the uniqueness of said offer ID number and resolving possible collisions with other offers; and
   wherein if said client has not designated a unique offer ID number for said coupon, generating a unique offer ID number for said coupon.

7. The process according to claim 5, wherein said offer ID number is implemented as ASCII character strings.

8. The process according to claim 5, wherein N is 6.

9. The process according to claim 1, wherein said receiving device is a digital video recorder.

10. The process according to claim 1, wherein said display device is a TV monitor.

11. The process according to claim 1, wherein said communication channel can be a telephone modem, or a cable modem, or a local area network.

12. A system for coupon encryption, distribution, and validation, comprising:
   plurality of coupons, each of said coupons is designated a unique offer ID number;
   an information service center which comprises an activation database, a coupon authentication number database, and a key server;

a plurality of service receiving devices, each of which is coupled to a display device;

a channel through which said information service center and a service receiving device communicate;

wherein said information service center generates a unique coupon authentication number for each said service receiving device, wherein said coupon authentication number is stored in said coupon authentication number database and is communicated to said key server;

wherein said key server encrypts said coupon authentication number using an encryption algorithm and sends the encrypted coupon authentication number to said service receiving device;

wherein said service receiving device comprises a crypto-chip and a hard drive;

wherein said service receiving device decrypts the encrypted coupon authentication number;

wherein said crypto-chip performs a hash operation on said offer ID number using said coupon authentication number and takes the fast or last N digits of the hashed result as a coupon ID number for said coupon; and wherein said coupon may be validated by said key server, which uses said service receiving device's serial number to look up the coupon authentication number stored in said coupon authentication number database and performs a hash operation on said offer ID number using said coupon authentication number and compares a base number taken from the first or last N digits of the hashed result with said coupon ID number submitted, and validates said coupon if said base number and said coupon number match.

13. The system according to claim 12, wherein said receiving device is a digital video recorder.

14. The system according to claim 12, wherein said channel can be a telephone modem, or a cable modem, or a local area network.

15. The system according to claim 12, wherein said coupon authentication number is randomly generated and can be of any length of bits.

16. The system according to claim 12, wherein said offer ID number is randomly generated and can be of any length of bits.

17. The system according to claim 12, wherein said offer ID number is implemented as ASCII character strings.

18. The system according to claim 12, wherein N is 6.

19. The system according to claim 12, wherein said display device is a TV monitor.

20. An apparatus for generation, delivery, and validation of electronic coupons via a telecommunication system, comprising:

a coupon generation module, wherein said coupon generation module generates a unique coupon authentication number for each of a plurality of receiving devices;

a delivery module, wherein said delivery module delivers an electronic offer ID to one or more receiving devices;

wherein a receiving device generates a coupon ID number using the receiving device's coupon authentication number and the offer ID;

a validation module, wherein said validation module validates said coupon ID number when a user redeems said coupon ID number using the receiving device's coupon authentication number;

wherein said telecommunication system includes a service center, a plurality of receiving devices, a display device coupled to each receiving device, a communication channel connecting said service center and each receiving device;

wherein said service center comprises at least an authentication number database and a key server;

wherein said receiving device comprises a persistent storage device which stores one or more public keys assigned to said receiving device, and a crypto-chip which stores one or more private keys assigned to said receiving device;

a submission module, wherein said submission module submits said offer ID number, said receiving device's serial number, and said coupon ID number to a vendor by the user that redeems said coupon;

an entry module, wherein said entry module accepts entry, by said vendor who accesses said service center, said offer ID number, said receiving device's serial number, and said coupon ID number;

a checking module, wherein said checking module checks, by said key server, said receiving device's authentication number from said authentication number database;

a hash module, wherein said hash module performs a hash function on said offer ID number using said receiving device's authentication number as a key;

a comparison module, wherein said comparison module takes the first N digits of the hashed result and compares the N-digit number with said coupon ID number submitted by the user; and a validation module, wherein said validation module validates said coupon if said N-digit number matches with said coupon ID number.

21. The apparatus according to claim 20, wherein the coupon generation module further comprises:

a receiving device activation module, wherein said receiving device activation module activates a receiving device;

wherein said coupon authentication number is randomly generated and can be of any length of bits;

a coupon authentication number saving module, wherein said coupon authentication number saving module saves said coupon authentication number in said authentication number database;

a coupon authentication number communication module, wherein said coupon authentication number communication module communicates said coupon authentication number to said key server;

an encrypting module, wherein said encrypting module encrypts said coupon authentication number; and a encrypted coupon authentication number sending module, wherein said encrypted coupon authentication number sending module sends said encrypted coupon authentication number to a receiving device which adds said encrypted authentication number to said receiving device's keyring as a coupon key.

22. The apparatus according to claim 21, wherein said encrypting module is performed on said key server using said receiving device's public key which is stored both in an activation database and said receiving device's persistent storage device.

23. The apparatus according to claim 21, further comprising:

an embedding module, wherein said embedding module embeds a date or time stamp in said coupon key for convenience to replace said authentication number whenever said authentication number database is compromised.

24. The apparatus according to claim 20, wherein the delivery module further comprises:

an order receiving module, wherein said order receiving module receives an order from a client to issue an electronic coupon, which is an offer to sell a specific product or service;

a confirming module, wherein said confirming module confirms an offer ID number for said coupon;

a coupon sending module, wherein said coupon sending module sends coupon information to said display device through said receiving device;

an offer ID number hashing module, wherein said offer ID number hashing module performs a hash operation by said receiving device's crypto-chip on said offer ID number using said encrypted coupon authentication number if a user decides to accept said offer; and a display module, wherein said display module displays the first N digits of the hashed result as a coupon ID number, with which, together with said offer ID number and said receiving device's serial number, the user may redeem said coupon.

25. The apparatus according to claim 24, wherein said confirming module further comprises:

an offer ID number checking module, wherein said offer ID number checking module checks whether or not said client has designated a unique offer ID number for said coupon;

wherein if said client has designated a unique offer ID number for said coupon, said offer ID number checking module checks the uniqueness of said offer ID number and resolves possible collisions with other offers; and wherein if said client has not designated a unique offer ID number for said coupon, said offer ID number checking module generates a unique offer ID number for said coupon.

26. The apparatus according to claim 20, wherein said receiving device is a digital video recorder.

27. The apparatus according to claim 20, wherein said display device is a TV monitor.

28. The apparatus according to claim 20, wherein said communication channel can be a telephone modem, or a cable modem, or a local area network.

* * * * *

UNITED STATES PATENT AND TRADEMARK OFFICE
CERTIFICATE OF CORRECTION

PATENT NO. : 7,055,031 B2 Page 1 of 1
APPLICATION NO. : 09/784512
DATED : May 30, 2006
INVENTOR(S) : David C. Platt It is certified that error appears in the above-identified patent and that said Letters Patent is hereby corrected as shown below:

In Section (73) on the front page of U.S. Patent No. 7,055,031 B2:

Replace: "Assignee: TiVo, Inc., Alviso, CA (US)"

With: -- Assignee: TiVo Inc., Alviso, CA (US) --

Signed and Sealed this

Seventeenth Day of June, 2008

JON W. DUDAS
*Director of the United States Patent and Trademark Office*